(12) United States Patent
Harris et al.

(10) Patent No.: US 12,440,789 B2
(45) Date of Patent: Oct. 14, 2025

(54) RECTANGULAR FILTERS, ASSEMBLY AND METHOD FOR FILTRATION

(71) Applicant: FILTRATION TECHNOLOGY CORPORATION, Houston, TX (US)

(72) Inventors: James Harris, Houston, TX (US); Tyler J. Johnson, Houston, TX (US); Christopher D. Wallace, Houston, TX (US)

(73) Assignee: FILTRATION TECHNOLOGY CORPORATION, Houston, TX (US)

( * ) Notice: Subject to any disclaimer, the term of this patent is extended or adjusted under 35 U.S.C. 154(b) by 756 days.

(21) Appl. No.: 17/832,473

(22) Filed: Jun. 3, 2022

(65) Prior Publication Data
US 2022/0288519 A1 Sep. 15, 2022

Related U.S. Application Data

(62) Division of application No. 15/901,580, filed on Feb. 21, 2018, now Pat. No. 11,364,458.

(60) Provisional application No. 62/462,327, filed on Feb. 22, 2017.

(51) Int. Cl.
| | |
|---|---|
| *B01D 53/22* | (2006.01) |
| *B01D 45/02* | (2006.01) |
| *B01D 46/00* | (2022.01) |
| *B01D 46/24* | (2006.01) |
| *B01D 46/42* | (2006.01) |
| *B01D 46/52* | (2006.01) |
| *B01D 46/58* | (2022.01) |
| *B01D 50/20* | (2022.01) |

(52) U.S. Cl.
CPC ......... *B01D 46/0031* (2013.01); *B01D 45/02* (2013.01); *B01D 46/0008* (2013.01); *B01D 46/2403* (2013.01); *B01D 46/4227* (2013.01); *B01D 46/521* (2013.01); *B01D 46/58* (2022.01); *B01D 50/20* (2022.01); *B01D 2275/201* (2013.01); *B01D 2275/205* (2013.01)

(58) Field of Classification Search
CPC .... B01D 46/0031; B01D 46/58; B01D 50/20; B01D 45/02; B01D 46/0008; B01D 46/2403; B01D 46/4227; B01D 46/521; B01D 2275/201; B01D 2275/205
See application file for complete search history.

(56) References Cited

U.S. PATENT DOCUMENTS

| | | | | | |
|---|---|---|---|---|---|
| 2,359,138 | A | * | 9/1944 | Martin | D06F 43/085 210/167.01 |
| 2,508,297 | A | * | 5/1950 | Ruth | F01N 3/04 55/319 |
| 2,909,285 | A | * | 10/1959 | Besler | B01D 29/94 210/330 |
| 2,979,311 | A | * | 4/1961 | Bungas | F24F 1/00 165/121 |
| 3,217,888 | A | * | 11/1965 | Fuchs | B01D 24/08 210/318 |

(Continued)

*Primary Examiner* — Anthony R Shumate
(74) *Attorney, Agent, or Firm* — Boulware & Valoir PLLC

(57) ABSTRACT

The present invention discloses a rectangular shaped filter and coalescer elements and a vessel that houses a plurality of such rectangular shaped elements. Greater filtration or separation efficiency is provided due to increased number and alignment of rectangular shaped filter elements in the vessel. The rectangular shaped filter elements are also easy to replace.

6 Claims, 10 Drawing Sheets

(56) References Cited

U.S. PATENT DOCUMENTS

| | | | | |
|---|---|---|---|---|
| 3,250,063 A * | 5/1966 | Andrews | B01D 46/10 | 55/504 |
| 3,250,242 A * | 5/1966 | Pekarek | B01D 35/143 | 210/DIG. 17 |
| 3,568,412 A * | 3/1971 | Schwab | B01D 46/02 | 91/1 |
| 3,698,161 A * | 10/1972 | Brixius | B01D 46/02 | 55/486 |
| 3,840,402 A * | 10/1974 | Tobin | B01D 46/79 | 134/29 |
| 4,129,429 A * | 12/1978 | Humbert, Jr. | B01D 46/121 | 210/493.1 |
| 4,632,755 A * | 12/1986 | DeGraffenried | B01D 29/15 | 210/488 |
| 5,145,033 A * | 9/1992 | Bedi | B01D 35/306 | 184/6.24 |
| 5,776,341 A * | 7/1998 | Barnard | B01D 35/027 | 210/462 |
| 7,523,603 B2 * | 4/2009 | Hagen | F01K 21/047 | 422/607 |
| 2002/0072459 A1 * | 6/2002 | Schlor | B01D 46/521 | 493/373 |
| 2005/0120687 A1 * | 6/2005 | Casey | B01D 50/20 | 55/423 |
| 2008/0185323 A1 * | 8/2008 | Kargenian | B01D 69/10 | 210/323.1 |
| 2009/0321339 A1 * | 12/2009 | Suzuki | B01D 29/96 | 210/232 |
| 2011/0232242 A1 * | 9/2011 | Champion | B01D 46/12 | 55/483 |
| 2011/0290116 A1 * | 12/2011 | Jarrier | B01D 46/58 | 95/286 |
| 2012/0067013 A1 * | 3/2012 | Antony | B01D 29/05 | 55/357 |
| 2013/0048549 A1 * | 2/2013 | Burrows | C02F 1/441 | 210/232 |
| 2015/0075123 A1 * | 3/2015 | Carter | B01D 46/2403 | 29/428 |
| 2015/0182082 A1 * | 7/2015 | Garcia-Otero | B01D 46/2403 | 55/492 |
| 2017/0119204 A1 * | 5/2017 | Powell | C02F 1/003 | |
| 2017/0197165 A1 * | 7/2017 | Schwartz | B01D 46/58 | |
| 2017/0274313 A1 * | 9/2017 | Wall | F02M 35/02425 | |
| 2018/0017298 A1 * | 1/2018 | Dziubinschi | B01D 15/26 | |
| 2018/0339254 A1 * | 11/2018 | Kaufmann | B01D 46/0005 | |
| 2021/0060465 A1 * | 3/2021 | Wallace | B01D 17/10 | |
| 2021/0060472 A1 * | 3/2021 | Oranje | B01D 46/2403 | |
| 2021/0205745 A1 * | 7/2021 | Beier | B01D 46/0043 | |
| 2021/0252445 A1 * | 8/2021 | Mori | F24F 13/28 | |
| 2021/0331104 A1 * | 10/2021 | Gregerson | B01D 35/306 | |
| 2022/0241712 A1 * | 8/2022 | Iggander | B01D 46/521 | |

* cited by examiner

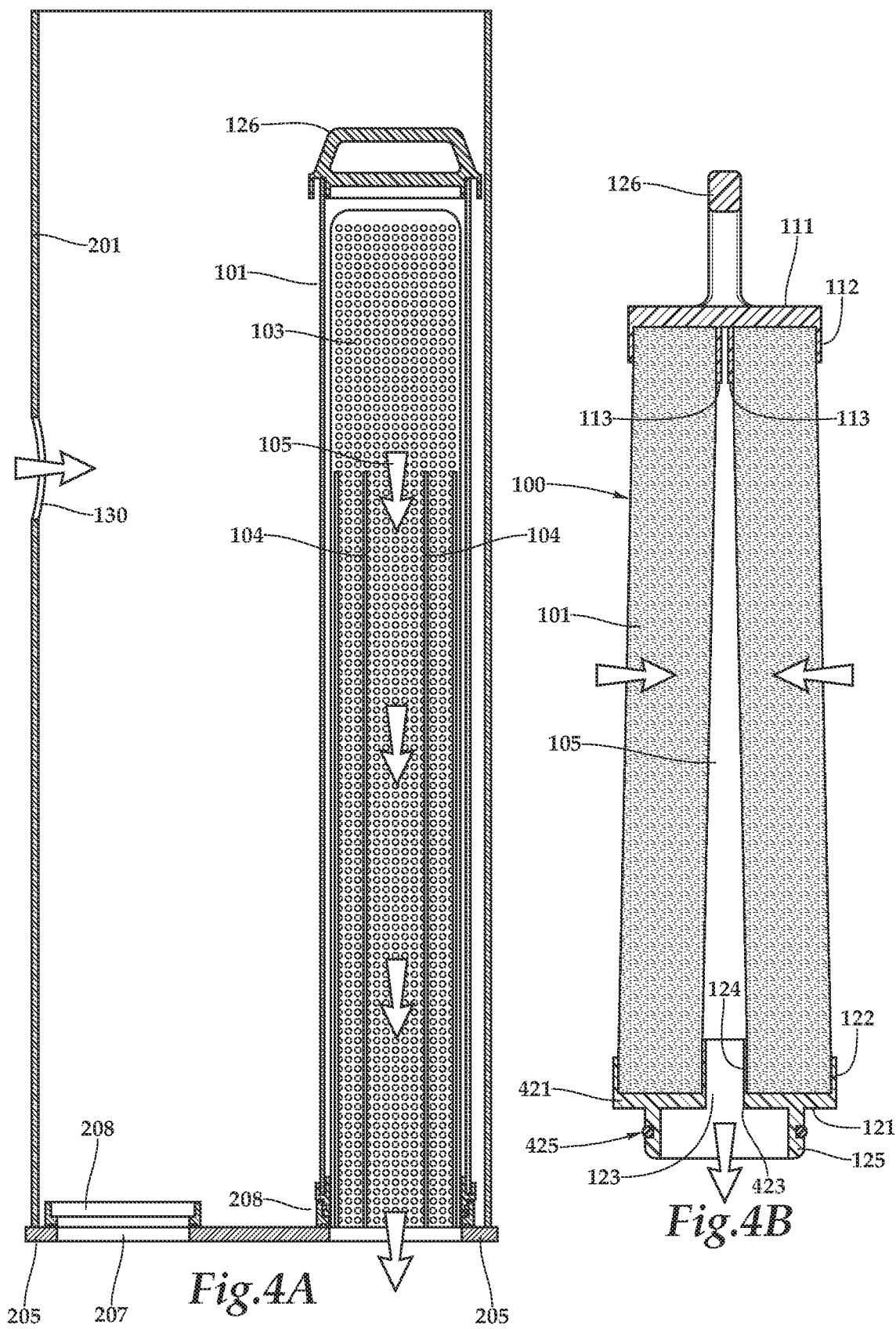

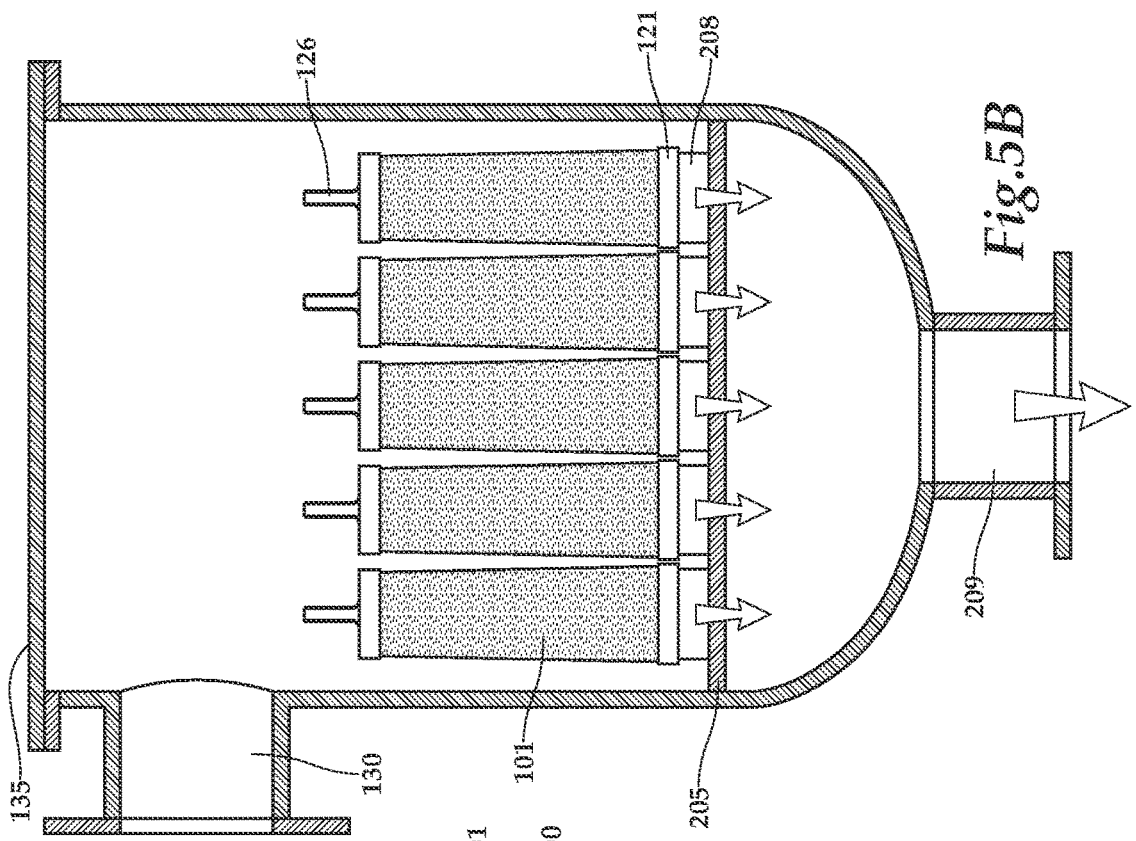
Fig.5B
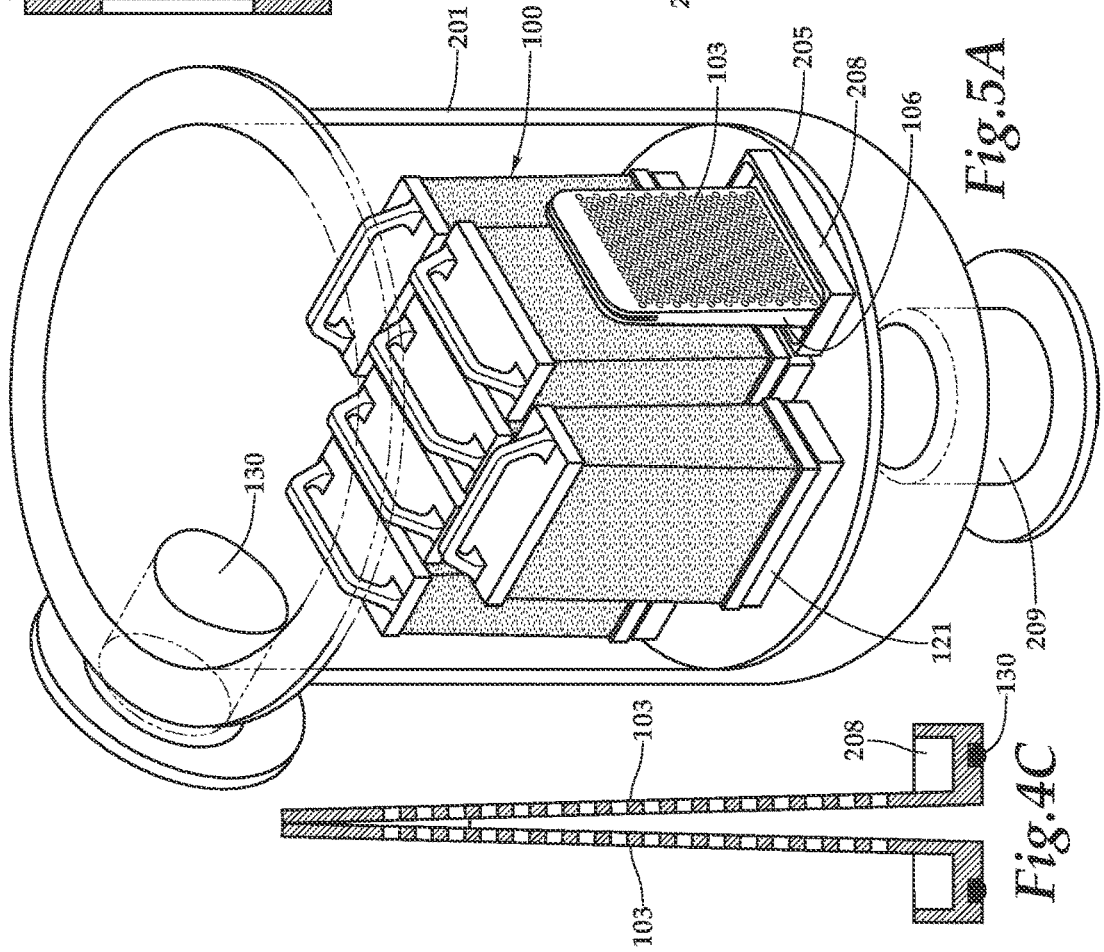
Fig.5A
Fig.4C

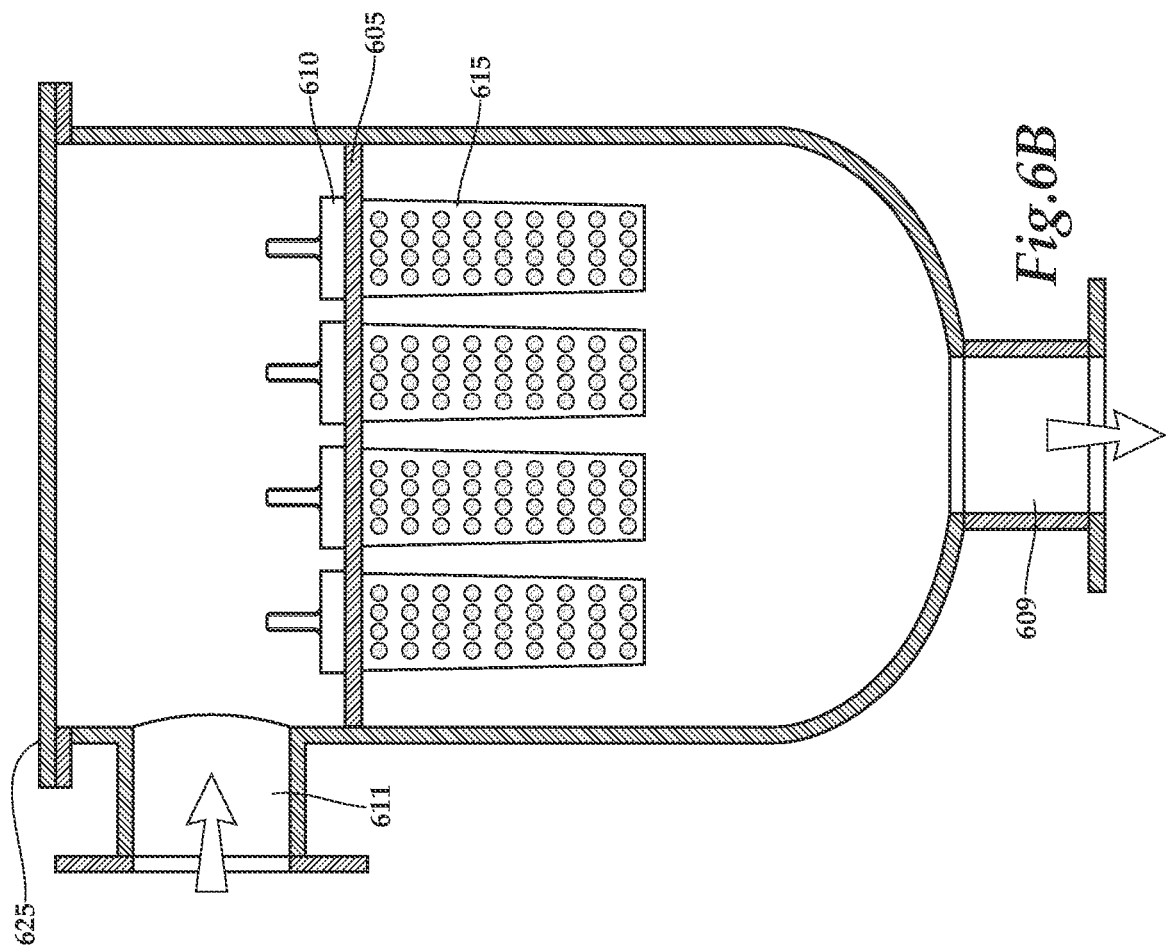
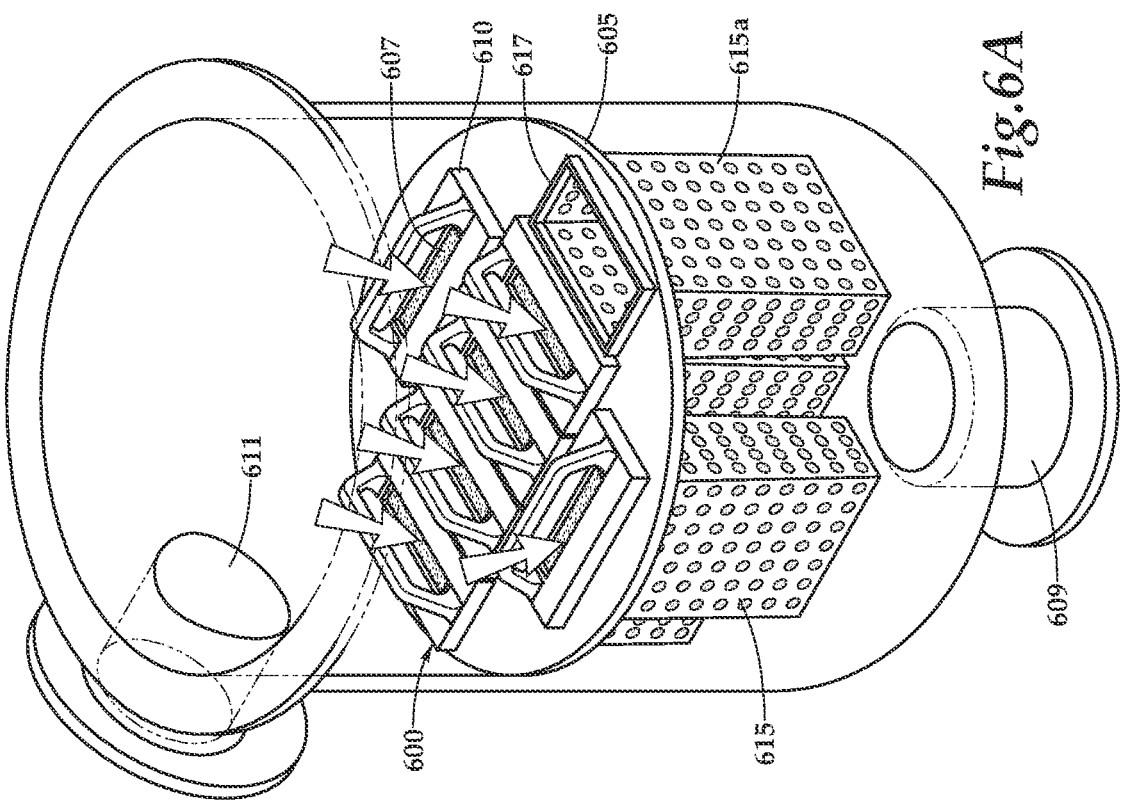

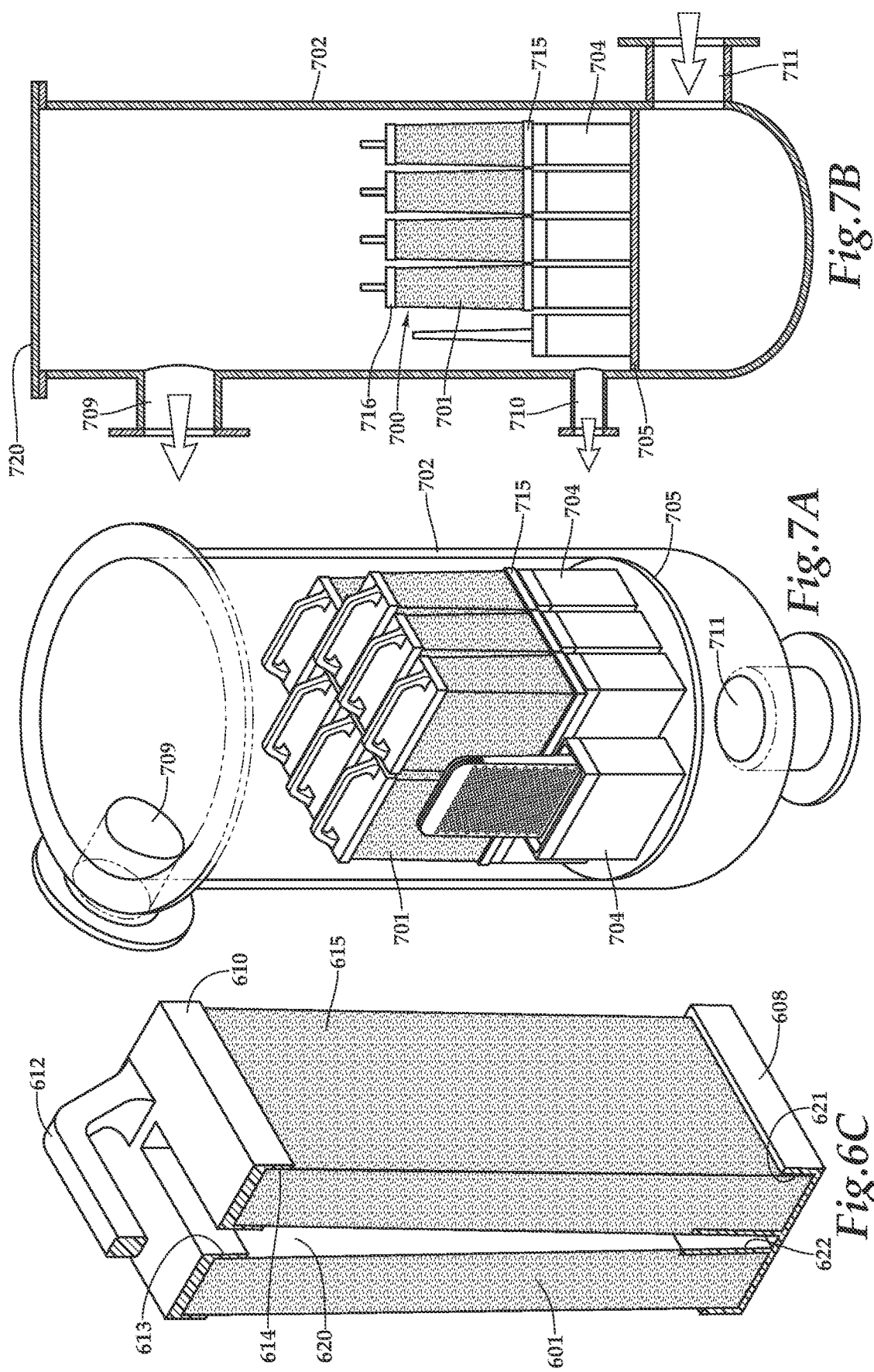

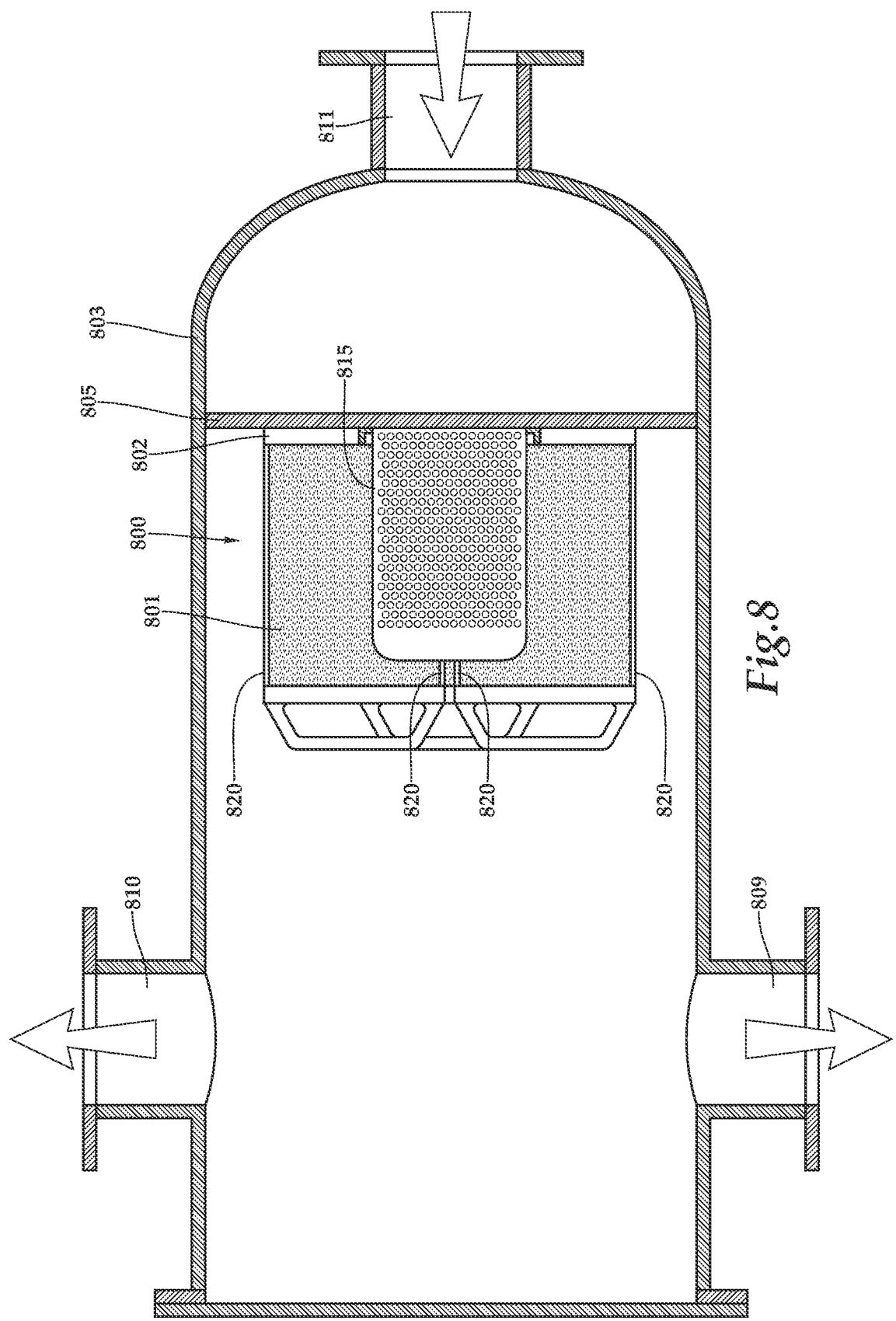

RECTANGULAR FILTERS, ASSEMBLY AND METHOD FOR FILTRATION

PRIOR RELATED APPLICATIONS

This application is a divisional application of U.S. application Ser. No. 15/901,580, filed Feb. 21, 2018, which claims priority to U.S. provisional application 62/462,327, filed Feb. 22, 2017, each of which is incorporated herein in its entirety for all purposes.

FEDERALLY SPONSORED RESEARCH STATEMENT

Not applicable.

FIELD OF THE DISCLOSURE

The disclosure generally relates to rectangular shaped filters, the assembly of rectangular shaped filters in a filter housing and method for filtering. The rectangular filters can also be trapezoid-shaped. The rectangular shaped filter media may be pleated media therein that are capable of high efficiency filtration as well as easy replacement. The rectangular shaped filters can be used to filter many types of fluids and fluid mixtures.

BACKGROUND OF THE DISCLOSURE

Industrial filtration systems generally comprise cartridge filters located within corresponding filter housings, and fluids to be filtered (influents) are introduced into the filter housings and filter elements for the removal of debris, contaminants and particles. These cartridge filters generally have a cylinder shape with a hollow core. Influents are supplied either to the hollow core and flowing outwards through the media of the cartridge filters (inside to outside) or the influent flows from the outside of the filter into a core (outside to inside flow), leaving debris, contaminants and particles at the surface of the media. The cylindrical cartridge filters of pleated media, while easy to manufacture and use, do not effectively utilize the space inside the filter housing.

Therefore, there is a need for a new filter element and corresponding filter configuration to increase the volume of fluid that can be filtered in the same size filter housing, or provide a filter system that can filter the same volume of fluid or even more in a smaller housing. The new assembly can be installed in the commonly used cylindrical filter housing, but can be used with filter housings of different shapes that will accommodate a rectangular filter such as a square or rectangular filter housing. A new assembly and method can be used for liquid/gas separation and liquid/liquid separation in a coalescing process as well.

SUMMARY OF THE DISCLOSURE

This invention is for a generally rectangular shaped filter or coalescer element, an assembly with a plurality of rectangular shaped filters and methods of filtration using a plurality of rectangular shaped filters. In one embodiment, the rectangular shaped filters are generally comprised of a rectangular shaped top cap, a rectangular shaped bottom cap, and filter media extending between the top cap and the bottom cap. The filter media can be pleated or non-pleated depth media. The pleated filter media can be a single sheet of filter folded into pleats, providing a central void inside the pleats. The pleated media can have multiple layers of the same or different materials depending on the desired filter. Two rows of pleats are formed along the longer sides of the rectangle. At the shorter end of the rectangle there can be one layer of non-pleated media or small pleats. The rectangular arranged pleated media creates a central void. The bottom cap has a central outlet communicating with the central void created by the pleated media. A filter support can also be provided within the inside the central void to maintain the longitudinal integrity of the filter elements. The support is preferably made of a rigid material. The filter support can be perforated to allow fluid flow inside the void created by the pleated media. The top cap also can have a handle for easier insertion/removal of individual filter elements and the handle can fold down on the top cap.

The rectangular shaped filter element has a generally rectangular shape and more preferably the filter element is trapezoid-shaped with the top and bottom shorter sides of the trapezoid parallel to each other and the other longer sides flaring out such that one of the caps is longer than the other to accommodate the flare. In this specification the filter elements will be referred to as rectangular, but this term includes the trapezoidal shape.

This invention also includes the filter assembly utilizing a plurality of rectangular shaped filter elements utilized in a filter housing (also referred to as a vessel) that is typically cylindrical, but be used with filter housings of different shapes that will accommodate a rectangular filter such as a square or rectangular filter housings. This description will refer to the typical cylindrical housing, but other shapes may be used as known to those skilled in the art. A plurality of the rectangular shaped filter elements are arranged compactly inside a filter housing with space for fluid flow around and in between the filter elements.

The filter elements are arranged to maximize the filtration area inside the filter housing, which also increases the filter capacity, i.e. the amount of fluid the filter is capable of filtering at a given time. The filter housing has fluid inlet for fluid to enter into the housing that contains the plurality of rectangular shaped filter elements. A separation plate is provided inside the filter housing sealably secured to the inner circumference of the filter housing. Filter receivers are mounted on the separation plate and the rectangular shaped filter elements are inserted or otherwise secured in the filter receivers that also have openings that communicate with the opening in the bottom caps. The separation plate has a plurality of openings that communicate with the openings in the filter receivers. The supports are mounted on the filter receivers and extend into the central void of each rectangular shaped filter without hampering fluid flow from the central void of the rectangular shaped filter and through the openings in the separation plate.

The rectangular shaped filter may include a mesh enclosing the filter media. The dirty fluid is introduced into the filter housing through a fluid inlet. The fluid then passes through the filter media into the central void of the rectangular shaped filters and the filtered fluid passes through the opening in the bottom cap and the corresponding opening in the separation plate. A chamber is provided in the filter housing below the separation plate to collect the filtered clean fluid. A clean fluid outlet in the filter housing is located in this chamber for allowing the filtered fluid to collect and remove clean fluid from the filter housing. This embodiment is used for outside to inside flow.

A further embodiment of the invention is the use of rectangular shaped filters for inside to outside flow. A filter housing has with a filter inlet for dirty fluid. The rectangular shaped filters are mounted under the separation plate. In this embodiment the rectangular shaped filters have rectangular top cap with an opening, a rectangular solid bottom cap, filter media extending from under the top cap to the bottom cap with a central void that communicates with the opening in the top cap. The separation plate is spaced from the bottom of the filter housing to accommodate the length of the rectangular filters. The separation plate is sealably secured to the inner circumference of the filter housing in the filter assembly and is provided with openings to receive and secure in place the rectangular shaped filters with the top caps extending above the separation plate. The openings in said tops caps receive the fluid to be filtered such that the fluid passes into the central void in the rectangular shaped filter and through the media and into the filter housing below the separation plate. The clean fluid collects in the filter housing outside the rectangular filter elements below the separation plate in the filter housing. An outlet is provided on the filter housing below the separation plate to remove the clean fluid. The filters can be surrounded by baskets to maintain the integrity of the filters during use which extend from the bottom of the separation plate and sized to receive the rectangular shaped filters.

An additional embodiment of this invention is the use of the rectangular shaped elements in the separation of gas from liquid by a coalescence process. A housing has an inlet near the bottom for the entry of a mixture of the gas and liquid. The housing has a separation plate sealably mounted to the inside wall of the housing. There are openings in the separation plate that communicate with a plurality of hollow risers that are preferably rectangular in shape that are mounted on top of the separation plate. A plurality of rectangular shaped coalescer elements are mounted on the top of the hollow risers and have a central void open in the bottom cap and a solid top cap. The gas/liquid mixture enters through the housing, through the openings in the separation plate, through the hollow riser and into the coalescing media through the void. The gas then rises to the top of the housing and is collected through an outlet. The liquid remains in housing above the separation plate and can be drained or collected as desired. This invention also includes the method of gas/liquid separation described herein.

A further embodiment of the invention is a filter assembly that can be operated with a long axis of a filter housing placed horizontally to separate a mixture of heavy and light fluids assisted by gravity. A fluid inlet located on the filter housing with a separation plate sealably secured to the inner circumference of the housing. A plurality of rectangular shaped coalescers are mounted on the separation plate and enclosed in the housing. Each of the rectangular shaped coalescers has a cap with an opening communicating with a central void surrounded by media. The cap is mounted on the separation plate that has openings in communication with the cap openings and further in communication with the void in media. A solid cap is on the opposite end of the rectangular shaped filter from the end mounted in separation plate. The fluid to be separated passes through the openings in the separation plate and the cap of the coalescer element mounted thereon into the central void of the rectangular shaped filters. The fluid mixture then passes through the media. The fluid mixture is collected in the filter housing on the side opposite the separation plate from the inlet. The lighter fluid floats to the top of the filter housing and the heavier fluid settles to the bottom of the filter housing. The filter housing is provided with an outlet on the top to collect the lighter fluid and an outlet on the bottom to collect the heavier fluid. Another related embodiment utilizes a vertical housing with risers similar to the gas/liquid separation design discussed above. The lighter liquid is collated at the top of the housing, while the heavier liquid settles around the risers above the separation plate and is collected. This invention also includes the method of liquid/liquid separation described herein.

This invention also includes methods for filtering fluid by introducing fluid to be filtered into a filter housing with a plurality of rectangular shaped filters. Then, passing the fluid through filter media of the rectangular shaped filters into a central void provided therein. Further collecting the filtered fluid from the central void of each rectangular shaped filter in a separate chamber of the filter housing and removing the filtered fluid from the filter housing. Alternatively, the fluid introduced into the filter housing can be introduced into a central void located in each of the rectangular shaped filters and further passed through a layer of media surrounding the void. The fluid is collected in a separate chamber of the filter housing and removed.

As used herein, "influent" or "dirty fluid" means the fluid to be introduced to and filtered by the filter.

As used herein "inside to outside flow" means fluid flowing from the inside of a filter to the outside of the filter and can be used interchangeably with "inside to out" or "inside out".

As used herein "outside to inside flow" means fluid flowing from the outside of a filter to the inside and can be used interchangeably with "outside to in".

As used herein, "effluent" or "clean fluid" means the clean filtered fluid already passing through the filter media.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

BRIEF DESCRIPTION OF THE DRAWINGS

FIG. 4A is a partial cross-section showing of a filtration flow for outside in filtering.

FIG. 4B is a cross section of the fluid flow with the trapezoid-shaped filter element as an example.

FIG. 4C is a view of the perforated support.

FIG. 5A is a schematic view of the trapezoid-shaped filter elements inside a filter housing with flow-direction outside to inside.

FIG. 5B is a longitudinal cross-sectional view in the filter housing of the filter of FIG. 5A showing the filter.

FIG. 6A is a schematic view of a filter assembly showing the inside to outside flow direction.

FIG. 6B is a longitudinal cross-sectional view of the filter housing inside-out filter as shown in FIG. 6A.

FIG. 6C is a view of the rectangular shaped filter used for inside to outside flow direction.

FIG. 7A is a schematic view of a gas-liquid separation assembly with part of one coalescer removed to show the support structure.

FIG. 7B is a longitudinal cross-sectional view through the housing of the separator as shown in FIG. 7A.

FIG. 8 is a cross-sectional view of a liquid separation assembly for use in coalescing a mixture of liquids.

DETAILED DESCRIPTION

The present disclosure is for a novel rectangular shaped filter element and the use of a plurality of rectangular shaped filters in a cylindrical filter housing to achieve a more efficient filtration. The rectangular shaped filter elements can be used for outside in flow, inside out flow, separation of liquids and gases and a mixture of liquids as further described herein. The rectangular shaped filters can be used in the standard size cylindrical filter housings, but can also be manufactured to any size desired. The size of the filters shown herein is for illustrative purposes. Filter housings that are manufactured to accommodate cylindrical filters can be retrofitted to accommodate a plurality of rectangular shaped filter elements. An additional separation plate as shown in this invention can be retrofitted to accommodate the rectangular shaped filters and is installed above the separation plate for cylindrical filters for the outside to inside flow and inside to outside flow. For inside to outside flow the rectangular shaped filters are mounted under the separation plate as shown below.

The detailed explanation of the assembly and method of this invention may be made with reference to the drawings. The drawings are also illustrative and not necessarily to scale. The size of the rectangular shaped filters used in this invention can be made to the desired size according to needs.

The following examples are intended to be illustrative only, and not unduly limit the scope of the appended claims.

Figures 1A, 1B, 1C:
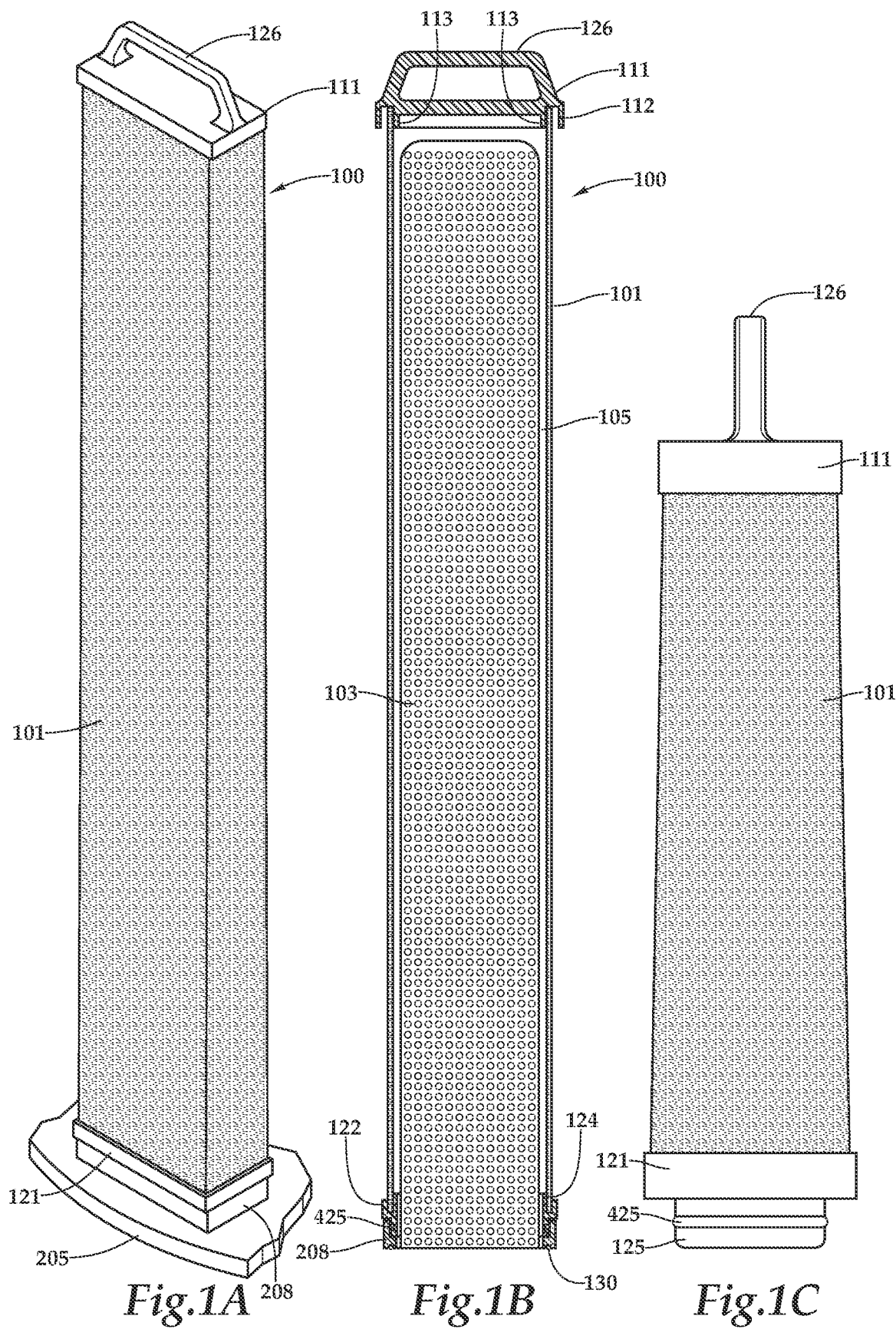
FIG. 1A is a schematic perspective view of a rectangular shaped filter element of this invention.
FIG. 1B is a cut away cross section wherein pleated filter media is cut out to reveal the perforated support.
FIG. 1C is a side view of a preferred embodiment showing a trapezoid-shaped filter element wherein the width of the filter element is gradually increased toward the bottom.
Figure 3A:
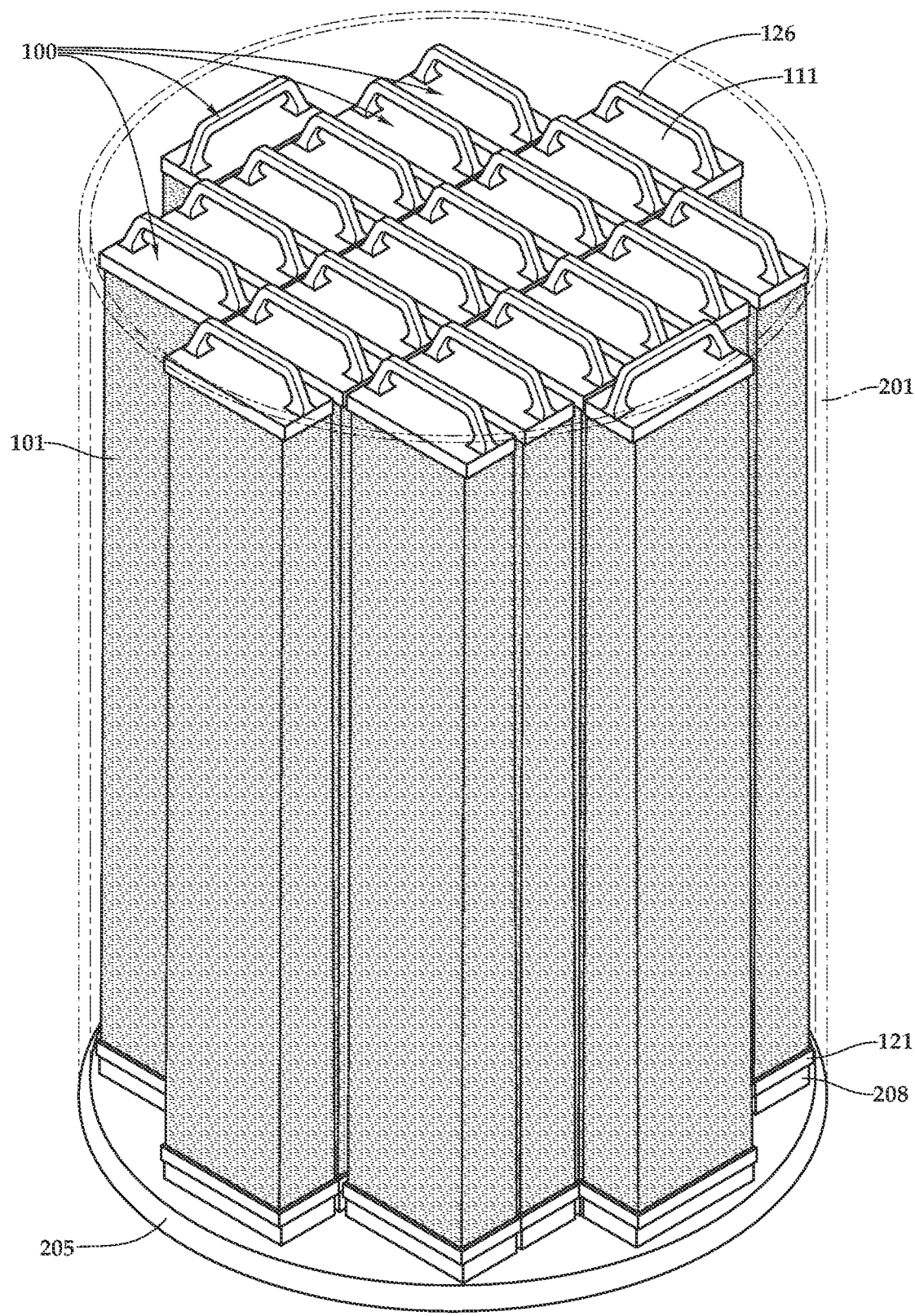
FIG. 3A is a perspective view of a filter system with a plurality of rectangular shaped filters arranged in the filter housing.

FIG. 1A is a schematic perspective view of the rectangular shape filter element 100 of this disclosure. The rectangular shaped filter element 100 is generally comprised of a top cap 111, a bottom cap 121, and the media 101 extending from the top cap 111 to the bottom cap 121. The top cap 111 is provided with a handle 126 that can be folded on top of the cap and provide a more compact profile for the installed rectangular shaped filter. The filter media 101 is preferably pleated to increase filtration area and filtration capacity. There is central void in the media surrounded by media (not shown in FIG. 1A). The rectangular shaped filter is mounted on the separation plate 205 (as shown in FIG. 3A) in a rectangular shaped filter receiver 208 that has lips extending upwardly from the separation plate to receive the outlet connector 125 on the bottom cap.

The filter or coalescing media material is not limited and can be customized depending on the type of filtration or coalescing. The media may be pleated media of cellulose and other natural media or synthetic media including but not limited to polypropylene, polyester, nylon, PTFE, PPS, ECTFE and PVDF. The pleated media may be one layer of material or multiple layers of different materials depending on the needs for filtration or separation. Other types of media including non-pleated depth media polypropylene, polyester, nylon, PTFE, PPS, PVDF, ECTFE, cellulose fiber, glass fiber, and woven wire mesh and ceramic media could be used. The filter media may be single use and disposable or reusable after cleaning. This invention is not limited to any type of media used in the rectangular shaped filters or coalescers.

Referring now to FIG. 1B is a cut away of the cross section of the rectangular shaped filter. The top cap and the bottom cap are securely attached to the media. Lip 112 on the top cap encloses the outer top edge of the media and inner lip 113 encloses and secures the inner top edge of the media. Lip 122 on the bottom cap encloses the outer bottom edge of the media and inner lip 124 on the bottom cap encloses the bottom inner edge of the media. In addition, the media is securely potted, thermally bonded, glued or otherwise firmly attached to the top and bottom caps between the lips. FIG. 1B also shows a cross section of the of the bottom cap outlet connector 125 that is inserted into the filter receiver 208 that is in turn mounted on the separation plate (not shown in FIG. 1B). The O-ring 130 can be provided on the bottom of filter receiver 208 to provide a secure seal with the separation plate other secure attachments can be used as well.

The media has a central void 105 which is shown in the cut away view with layers of filter media 101 shown on each side of the void 105. In the preferred embodiment a support 103 which is preferably perforated is inserted in the central void 105 of the media 101 for both maintaining the physical integrity of the filter element, as well as providing flow path for the filtered fluid within the void. The perforated support 103 is preferably mounted inside the filter housing as described below. The perforated support 103 can be made of any rigid and light material to support the overall weight and pressure within the pleated filter media. Non-limiting examples include plastic, metals and ceramics.

The shape of the perforated support 103 can also be tapered, i.e. the size being gradually increased to the bottom. The advantage of this tapered support is easier removal of the filter element because the inside of the filter element will be less likely interfere with the support 103 when a user is pulling the filter element upward to remove from the filter housing using the handle provided on the top cap.

Referring to FIG. 1C, which shows a preferred embodiment of the rectangular shape filter element 100 of this disclosure. As shown in FIG. 1C, the rectangular shape filter element 100 has a trapezoid shaped side profile, i.e. the cross-sectional area increases from top to bottom. The outlet connector 125 is shown on extending from the bottom cap 121. Also, O-ring 425 is provided on the outer circumference of the outlet connector 125 that is used to secure the rectangular shaped filter in place in the filter receiver 208.

The rectangular shaped filter elements effectively reduce the dead space created by circular filter elements. In addition, the trapezoidal shape allows easier insertion/removal of the filter elements. The rectangular shape also a can be aligned easily in rows if a specific orientation is required for the filter elements to function properly.

Figure 2A:
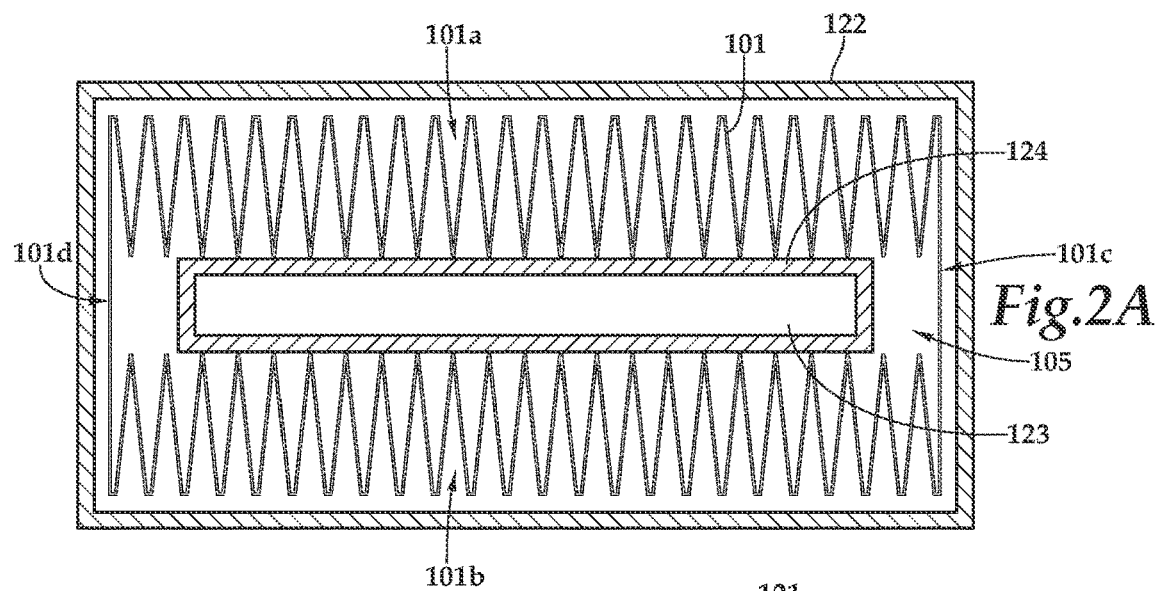
FIG. 2A is a bottom cross-sectional view of a rectangular shaped filter element of this disclosure with pleated filter shown and the bottom cap.

FIG. 2A is a horizontal cross-sectional view near the bottom of the rectangular shaped filter element showing the pleated media and the bottom cap. In the preferred embodiment, the filter media 101 is pleated around the central void 105 to allow the filtered fluid to flow through the pleated media and to exit into the void from an opening 123 located in the bottom cap 121. In this cross-section, it can be seen that the pleated filter media 101 can be one single sheet of filter media folded continuously around the center, forming an inside void 105, where filtered fluid flows, and the fluid collects inside the void 105 before exiting the filter element through the opening 123 on the bottom cap. The outer lip of the bottom cap is shown at 122 and the inner lip 124 is shown that enclose the ends of the media 101. The pleated media extending from the rectangular shaped top cap to the rectangular shaped bottom cap with two rows of pleats 101*a* and 101*b* on the long sides of the rectangle and with a layer of media 101*c* and 101*d* on the short sides connecting 101*a* and 101*b*, creating a generally central void 105 inside the pleats. The inner lip 124 is shown in this view. The top cap 111 and bottom cap 121 maintains the rectangular shape of the filter element. In addition a mesh (not shown) can enclose the filter media to maintain the generally rectangular shape. The mesh can be made of a polymeric or other material that will maintain its integrity when in contact with the fluids to be filtered.

The opening 123 is provided in the bottom cap 121. The opening 123 communicates with the central void 105. The opening in the bottom cap is defined by an outlet connector 125 that extends from the bottom cap. The profile of the perforated support is smaller than the opening on the outlet connector 125 and opening 123 so as to allow easy installation.

Figure 2B:
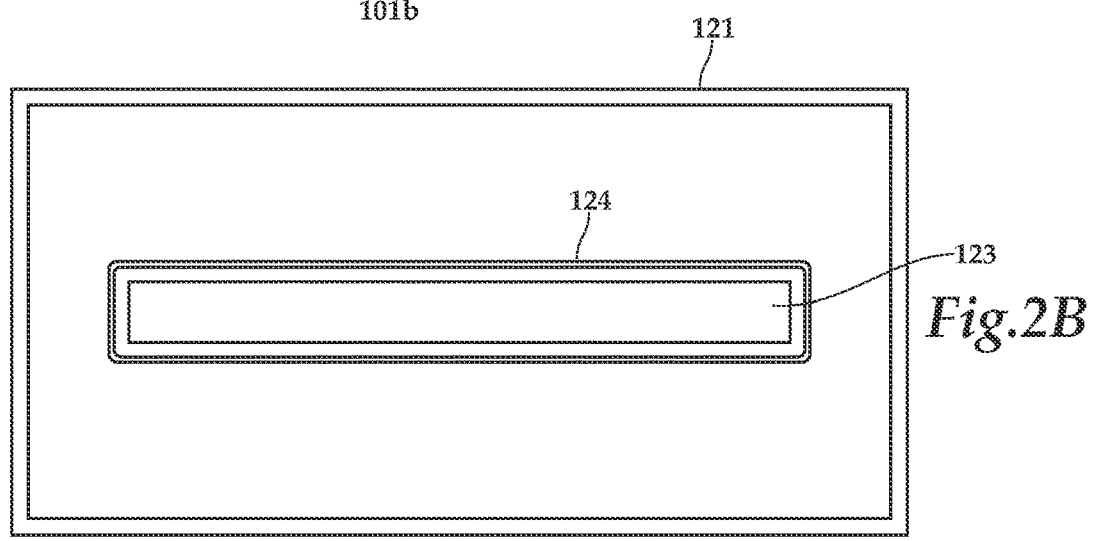
FIG. 2B is a bottom view of a bottom cap of a rectangular shaped filter element.

Referring now to FIG. 2B, which shows a perspective view of the inside of the bottom cap 121 and the opening 123 without media. The inner lip 124 is shown defining the opening 123.

Figure 2C:
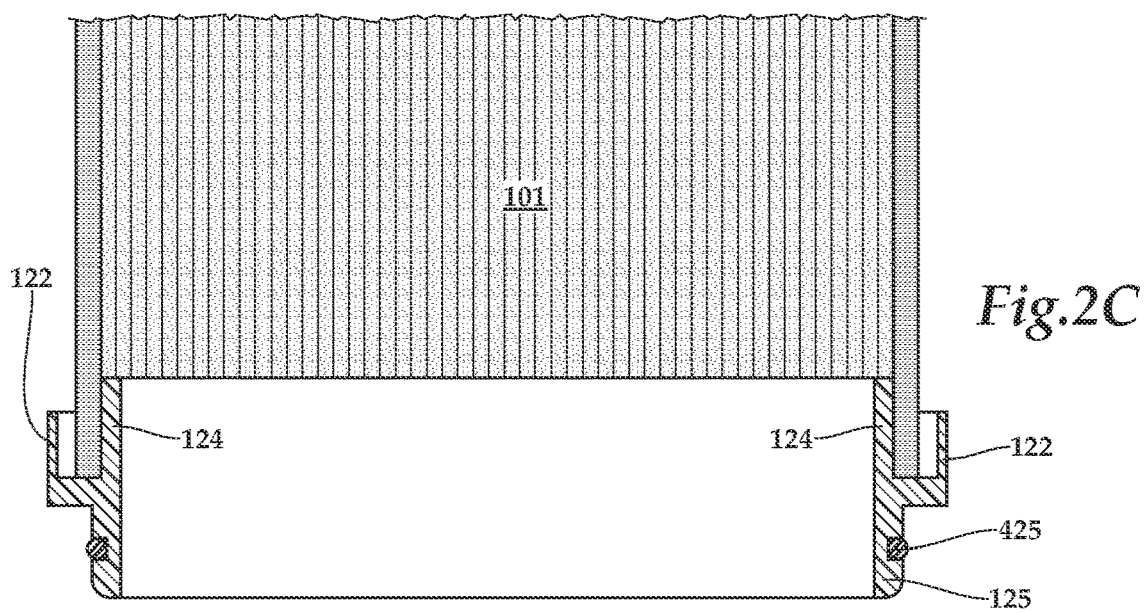
FIG. 2C is a partial vertical cross-sectional view the lower end of the rectangular shaped filter and the bottom cap.

Referring to FIG. 2C, shows a partial cross section view of the bottom section of a rectangular shaped filter element of this disclosure. This figure illustrates how the pleated filter media 101 interfaces with the bottom cap 121. Lip 122 is provided on the bottom cap to enclose the outer bottom edge of the media. Lip 124 is provided on the bottom cap to enclose the inner bottom edge of the media. The outlet connector 125 is shown on extending from the bottom cap. O-ring 425 is provided on the outer circumference of the outlet connector 125 that is used to secure the rectangular shaped filter in place on the filter receiver 208.

FIG. 3A shows a perspective view of the assembly of a plurality of rectangular shaped filters 100 inside a cylindrical filter housing 201 indicated by the dotted lines. Please note that the filter housing typically also includes a top (not shown) and the separation plate 205. (Discussed further below in FIGS. 3C-D). As shown in FIG. 3A, the filter elements 100 are arranged in an array, which preferably maximizes the filtration area inside the filter housing depending on the size of both the housing and the individual filter elements. Each filter element 100 has a top cap 111, on top of each is handle 126 which can fold down and is used for easier insertion/removal, especially when the filter has been in used for a long time and debris has accumulated in the filters adding weight to the filter elements. The handle 126 facilitates removing individual rectangular shaped filters 100. The bottom caps 121 are shown inserted onto the filter receivers 208.

As can be seen in FIG. 3A, the profile of each filter element is designed so that the dead space within the filter housing is kept to a minimum with multiple rectangular shaped filters. The space not occupied by the filter elements allows the dirty fluid to flow inside the housing, but does not create undesirable turbulent flow. This configuration also maximizes the filtration area provided by each rectangular shape filter element with the novel configuration of pleated filter media.

There is space between any two adjacent filter elements 100 to allow unfiltered fluid to flow through the filter media 101. The top caps 111 and bottom caps 121 do not prevent fluid from passing through the longitudinal axis of the filter media 101. The tapered or trapezoidal shape aids in provided a flow path to all of the media without creating turbulent flow.

Figure 3B:
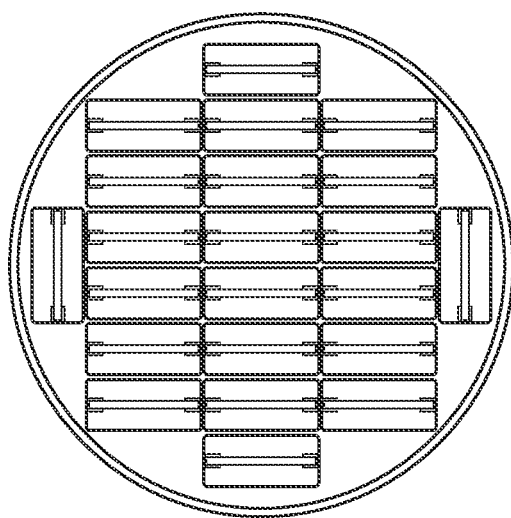
FIG. 3B is a top view of a filter assembly looking into the filter housing.

FIG. 3B is a top view showing the array of rectangular filter elements arranged inside the housing. This compact and tight fit allows for maximum filtration capacity and keeping dead space to a minimum.

Figure 3C:
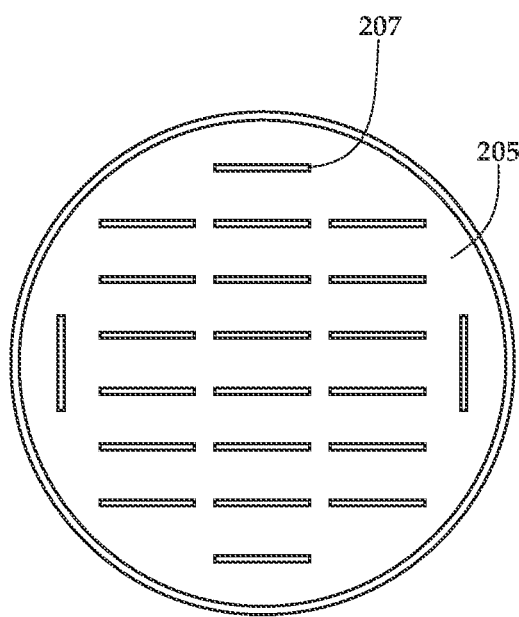
FIG. 3C is a top view of the separation plate showing the outlets.
Figure 3D:
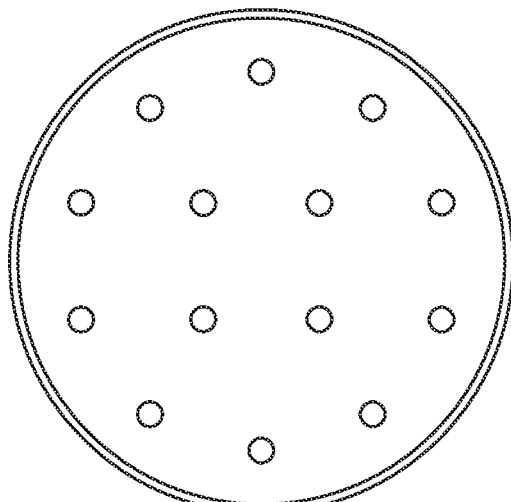
FIG. 3D is a top view of the separation plate of a conventional filter assembly showing fewer outlets than the present invention.

FIGS. 3C and D show the comparison between the separation plate of this disclosure and the plates used for conventional circular-shaped filter elements. FIG. 3C shows the rectangular openings on the separation plate, whereas FIG. 3D shows that of a typical separation plate that uses circular filter elements. There is more than a 50%-75% increased orifice area for fluid flow for the rectangular shaped filters, which translates into lower overall differential pressure. The greater cross sectional open area in the separator plate in comparison in the cylindrical as demonstrated in FIGS. 3C and D of the rectangular element results in lower pressure drop across the separator plate as well as more open area for additional flow if so desired. A lower starting differential pressure allows a longer operation cycle between replacing filter elements. For example, assuming a conventional filter vessel using circular filter elements where the starting differential pressure is 5 PSID and the maximum pressure being 35 PSID, this means there is a 30 PSID window for impurities to accumulate on the filter media. However, if the starting differential pressure can be reduced to 2 PSID by the trapezoid shaped filter elements, then the window is expanded by 3 PSID, which means longer operational life before the filter elements need to be replaced.

The differential pressure is the main driving force for fluid flow inside the filter housing. The fluid would flow along the path of least resistance, which generally starts at the bottom of the filter elements as the filter vessel fills up with fluid. This fluid flow continues, but as the filter media accumulates impurities toward the bottom of the filter element, the differential pressure at that location increases as well. As soon as the differential pressure is higher than other parts of the filter element, fluid flow would change direction to the lowest resistance, even if the differential is only 0.01 PSI. This dynamic fluid flow, along with the more compact interior inside the filter housing allows less turbulent flow, more even flow throughout the entire filter element and surface area at one time. The additional surface area provided by this novel shape reduces the face velocity of the fluid through the filter media. This lower face velocity results in less resistance or pressure drop across the media allowing for the lower pressure drop and increased dirt and particulate loading capacity in the filter elements. The benefits in additional dirt and particulate holding capacity is due to lower face velocities that are understood by one skilled in the art.

Referring now to FIG. 4A, which is an illustration of the outside to inside filtration flow using rectangular shaped filter elements. The dirty fluid is introduced through a fluid inlet 130 of the filter vessel 201 in the vessel wall. The dirty fluid then flows through a layer of the filter media 101 of one of the rectangular shaped filters, and the clean fluid flows through the central void 105 inside the filter media (indicated by the flow arrows in the drawing) which void 105 has the perforated support 103 inserted therein. The fluid then flows through the opening 123 in the bottom cap 121 that communicates with the filter receiver 208 mounted on separation plate 205. This view also shows optional stiffeners 104 mounted on the bottom face of the filter receiver 208 to provide additional stability to the perforated support 103. The outlet cap 125 of the bottom cap of each of the rectangular shaped filters is inserted in the upwardly projecting lips on the filter receiver 208 mounted on the top of separation plate. The O-ring 425 is used to provide a seal between the bottom cap and the rectangular shaped filter to secure the filter in place with a tight connection. The opening in the bottom cap communicates with a corresponding the outlet port 207 in the separation plate 205 thus providing fluid communication from the central void 105 with the filtered fluid through the separation plate to the chamber below in the filter housing.

FIG. 4B shows the vertical cross section of the rectangular shaped filter emphasizing the rectangular shaped filter with trapezoid configuration (using corresponding numerals to FIGS. 1A, B, C). The spacing of the central void 105 inside the filter element 100 gradually increases toward the lower portion that provides an increased area for fluid flow. This provides an increase in the fluid volume because the trapezoid filter element and media widens and the central void 105 correspondingly widens as the fluid flows towards the outlet 207. This structure provides less pressure drop with the fluid flow. The perforated support is not shown on this view.

FIG. 4B illustrates the filtration flow of the rectangular shape filter element having trapezoid profile. This is an outside to inside flow direction, where the filter opening 123 for the filtered fluid is located at the bottom cap 121 of the filter element 100. The fluid flows from outside of the filter media 101 to the center void 105, and eventually exits the rectangular shaped filter 100 through the filter opening 123 in the bottom cap. The bottom cap outlet connector 125 is secured into the filter receiver 208 on the separation plate via the O-ring 425.

Optionally, a gasket seal or a positive O-ring 425 can be provided on the bottom cap for a better seal between the bottom cap and the filter receiver 208 to avoid fluid bypass. Also, the O-ring or gasket seal can provide a resistance signal for the user that once the resistance is overcome, the filter element is installed in place.

Conventional housings can be retrofitted with a new separation plate of the current invention to accommodate rectangular shaped filters above the separation plate used for cylindrical filters. The new separation plate must have the correct outer diameter to fit sealably in the inner circumference of the filter housing and accommodate the length of filter elements can fit into the housing.

FIG. 4C is a cross-section of the of perforated support 103 showing a preferred embodiment that is made of two perforated rectangular rigid sheets mounted on either side of the opening 207 in the filter receiver 208 so as not to impede the filter flow. The tops of the perforated sheets meet. Narrow side panels 106 are between the perforated sheets extending from the top of the filter receiver 208 to the top of the perforated sheets (see FIG. 5A).

In a preferred embodiment additional stiffeners 104 as shown in FIG. 4A are provided between the perforated sheets and are mounted on top of the filter receiver 208 inside the perforated support 103. The O-ring 130 on the bottom of the filter receiver is shown in this view.

Referring to FIG. 5A, is a schematic view of a filter assembly having the rectangular filter elements 100 as installed in a filter housing 201. For ease of reference only seven (7) rectangular filters are shown in the schematic. The number of filter elements 100 in this figure is only for illustrative purpose, and the actual number of filter elements 100 will depend on many factors, such as the size of the filter housing, the fluid flow rate, the particulates to be filtered, and the nature of the fluid. One filter element has been removed to show the construction of the filter assembly with a perforated support 103. The separation plate 205 has a plurality of filter receivers 208 to receive the bottom caps the rectangular shaped filters with openings (not shown) matching the filter opening in the bottom caps 121 for each filter element 100. Also, the perforated support 103 is mounted to and extending from the filter receiver 208, and this configuration also facilitates installation and removal of individual filter elements 100 because the perforated support 103 also serves as a "guiding rail" matching the center void (not shown here) of each filter elements 100. The perforated supports 103 are mounted on the filter receivers 208 without impeding the fluid flow through the outlet ports 207.

This configuration for outside to inside fluid flow is also shown in FIG. 5B. This view shows the lid 135 of the filter vessel that is secured during the filtration process. The lid may be removed to replace and/or clean the rectangular shaped filters aided by the use of a handle to place and remove the filters. Also the trapezoidal shape of the filter is helpful in removal, because the wider base of the filter is not impeded by the rectangular support. At the start of filtration, the fluid to be filtered is introduced through the dirty fluid inlet 130 into an empty filter vessel, and then fills the filter vessel from the separation plate 205 upwards. When the fluid level reaches the filter media 101, the fluid flows across the filter media 101 and into the center void 105 of the filter elements 100. The filtered fluid that has passed through the filter media then flows through the outlet openings in the bottom caps of filter elements, through the corresponding openings in the filter receivers 208 and separation plate 205, and eventually exiting the filter housing through the clean fluid outlet 209 at the bottom of the filter vessel.

In addition, the increased number of filtered fluid openings in the separation plate effectively reduces the pressure drop across the filter, therefore also increases the filter efficiency. As well known in the field, excessive pressure drop adversely affects a filter's performance. Therefore, by increasing the flow-through space on the separation plate, it is possible to achieve an optimal level of pressure drop for better filter performance.

Referring now to FIGS. 6A, 6B and 6C are views that illustrate the use of the rectangular shaped filters in an inside to outside flow pattern in contrast to the outside to in flow shown in the prior drawings. For the inside to outside configuration, the filter elements 600 are shown mounted in the separation plate 605 and extend below. Each of the top caps 610 have a have an opening 607 that communicate with central void 620 (shown in FIG. 6C) of in the filter media 601. In this embodiment, separation plate 605 is sealably connected to the inside circumference of the vessel, but the rectangular shaped filters extend downward below the separation plate 605. The separation plate 605 can receive baskets 615 held in place by lips 617 to secure the filter elements under on the separation plate 605 and are sized to receive the rectangular shaped filters. One filter element is removed to show the basket structure 615a. As the fluid is being filtered, the baskets 615 prevent the filter media from expanding outwardly and maintain the integrity of the shape of the filter as the differential pressure increases. The top cap 610 of each filter element fits tightly into the separation plate and basket with an O-ring or gasket seal, so as to separate the dirty fluid from the filtered clean fluid. The outlet 609 is at the bottom of the filter vessel for removing the filtered fluid from the filter vessel.

FIG. 6B is a cross section of a side view of the filter vessel showing the fluid inlet 611. This view shows the lid 625 of the filter vessel that is secured during the filtration process. The lid may be removed to replace and/or clean the rectangular shaped filters. The fluid passes through the openings 607 of top caps 610 (shown in FIG. 6A) into the rectangular shaped filters held in the baskets 615 under the separation plate 605.

FIG. 6C is a cross section of a rectangular shaped filter for use with inside to outside flow removed from the basket. Top cap 610 is shown with a handle 612 and has inner lips 613 and outer lips 614 that secure the media 601 in a similar fashion as previously described for other embodiments. A solid bottom cap 608 has inner lips 622 and outer lips 621 to enclose the bottom edges of the media.

As illustrated in FIGS. 6A, B, and C, fluid is introduced from the dirty fluid inlet 611, and the fluid then enters the filter elements 600 through the openings 607 in the tops caps 610. The openings 607 in the tops caps communicate with the central void 620 in the filter media 601. The fluid flows from the inside of the filter elements 600 across filter media 601 to the outside of the rectangular shaped filter to complete the filtration process. The clean fluid leaves the filter housing through clean fluid outlet 609 in the filter housing below the separation plate 605.

FIGS. 7A-B illustrates another assembly and method using the rectangular shape elements preferably for separating a mixture of fluids composed of liquid and gas through coalescence. The mixture is typically is an aerosol. The dirty liquid/gas inlet 711 is preferably located on the side of the housing 702, the liquid outlet 710 is located above the separation plate 705 and the clean gas outlet 709 is located near the top of the housing well above the coalesced liquid outlet 710. This configuration allows the liquid/gas mixture to be naturally separated by gravity. Above the dirty liquid/gas inlet 711 is separation plate 705 which is sealably mounted inside the circumference of vessel 702. Each rectangular shaped coalescer is mounted on a rectangular shaped hollow riser 704 and the risers are sealably secured to the separation plate 705. The separation plate 705 has corresponding openings (not shown) that are in communication with the hollow inner chamber of each riser 704. The rectangular shaped coalescer elements 700 are sealably mounted on top of each riser 704. The rectangular shaped coalescer elements are constructed (similar to FIGS. 1 and 2) with central void in the media 701 in communication with an opening in the bottom cap 715 and a solid top cap 716. The rectangular shaped coalescer elements 700 may be provided with a perforated guide 725. The rectangular shaped coalescer element is placed in the vessel so the opening in the bottom cap is placed so the support 725 is inserted in central void. The support 725 serves as a guide for placement of the coalescer media elements. The rectangular shaped coalescer elements are also preferably trapezoidal in shape. The flow of the mixture of gas and liquid is inside out. The risers in this embodiment provide an area in the lower portion of the vessel for a liquid accumulation zone. The gas will pass through the rectangular shaped coalescer elements 700 and rise to the top of the housing. The liquid will pass through the coalescer elements and will accumulate by gravity in the bottom of the vessel.

The fluid flow of the gas/liquid mixture is through the inlet 711, through the hollow risers 704 into the openings in the bottom caps 715 of the rectangular shaped filters. The fluid then enters the central void of the rectangular shaped coalescer elements 700. The fluid then moves across the media 701 in an inside-out fashion to complete the separation process. The clean gas then moves to the top of the vessel and collected through gas outlet 709. FIG. 7B shows a cross section of this embodiment with the lid 720 of the vessel that can be removed to service the rectangular shaped coalescer elements as discussed previously.

The liquid will accumulate at the liquid accumulation zone during the separation process, where the coalescer elements 700 are elevated from the separation plate 705 by the risers. The clean gas then exits the housing 702 through the clean gas outlet 709, whereas the liquid is removed through a liquid outlet or drain 710. This liquid/gas separation is especially important in, for example, natural gas production. More particularly, the arrangement of the coalescer elements inside the housing not only increases the overall media area when pleated media is used. This results in higher liquid loading on the media and the rectangular shaped coalescers with more surface area has more fibers to intercept and drain the liquid droplets. There is a lower pressure drop with the gas moving through the increased surface area of the media and therefore, reduced flow resistance. When the trapezoidal coalescer elements are used in the preferred embodiment, the velocity of the gas is reduced as it moves upward to the additional free space between the coalescer elements. The result is more efficient liquid removal by reducing the annular velocity between each coalescer element Separation by gravity with the aid of the coalescence process occurs when the liquid-gas mixture crosses the coalescing media. The liquid aerosol would not naturally separate without the coalescing media. The high surface area of the coalescing media enhances the separation process by lowering the face velocity of the gas through the media so that the liquid aerosol droplets can be trapped or intercepted by the media fibers. Once they are intercepted, the droplets are able to coalesce and grow through the media. The droplets are then pushed through the media due to hydraulic drag by the gas flow. Once they pass through the media the droplets are now large enough for gravity to separate them from the gas stream. Basically, the gravitational forces are now higher than the hydraulic drag forces of the gas, since the droplets have been coalesced to a larger size with greater mass. The rectangular shaped coalescers are placed so that appropriate spacing between them is allowed so the droplets will fall by gravity rather than being carried upwardly by the gas.

Refer now to FIG. 8, which shows an assembly designed for separating a mixture of light and heavy liquids. Please note that the housing 803 is shown lying horizontally to take advantage of gravity separation for liquids with a different specific gravity. This process of separation of two liquid phases is also a process of coalescence. The coalescer elements facilitate the separation of the heavier and lighter liquids via the media speeding up the separation process by facilitating heavy and light droplet formation. This speeds up the process of separation over simple gravity separation. The rectangular shaped coalescer elements 800 are used in an assembly to facilitate coalescing in a similar way as the use of the elements in in the prior embodiments of this invention. The coalescer elements 800 are securely mounted on the separation plate 805. The liquid mixture is introduced through the inlet 811. The liquid then travels through the inlet openings (not shown) on the separation plate 805 and through openings in the caps 802 of rectangular shaped coalescer elements to the central void inside the elements. The liquid flow is inside to outside. The liquid mixture then moves from the central void across the media 801 in an inside-out fashion to complete the separation process. The coalesced fluids are generally separated by their density after, the heavier fluid will sink to the bottom of the housing and then exit through the heavy liquid outlet 809, whereas the lighter liquid will float to the top and then exit through the light liquid outlet 810. The rectangular shaped coalescer elements are preferably trapezoidal in shape and made as described herein. A support 815 can be provided mounted on the separation plate 805 and functions in the same way as previously described and is used as guide to insert the coalescer elements.

An advantage of using the rectangular shaped elements in a coalescer is the stacking arrangement that allows the elements to be arranged in rows (as shown in FIG. 3A). As used in the horizontal coalescer, each of rectangular shaped coalescer elements can have a non-porous side panel 820 on the narrower sides of each coalesce. And the rows of coalescers are stacked in the coalescer housing with the narrow sides facing the top and bottom of the vessel as shown in FIG. 8. As the heavier fluid settles to the bottom of the housing, it does not contact media of the coalescer below it, since the rectangular shaped coalescers are in rows and have the side panels blocking access to the media where the heavier filtered fluid would fall. This is a benefit over the use of an assembly of cylindrical coalescers, because some the heavier fluid would fall on the outside of a cylindrical coalescers positioned below and affect the efficiency of the coalescing process. The cylindrical element cannot effectively be aligned in rows to with free space between elements to eliminate interference as the heavier fluid falls to the bottom of the vessel.

Alternatively, the embodiment shown in FIGS. 7A and 7B can be used as a coalescer for liquid/liquid separation. The lighter fluid will float to the top and is removed using outlet 709 while the heavier fluid is removed though outlet 710.

Referring to FIGS. 9A,9B,10A and 10B illustrate how the filters of the present invention are arranged in an assembly effectively utilizing the space within the filter housings in 18 inch and 30 inch vessels typically used for industrial applications. Comparing to conventional configurations inside a filter housing where individual cylindrical-shaped filter elements are used, the rectangular shaped filter configuration allows for higher filtration media surface area while maintaining even fluid flow inside the housing. These figures show V-shaped baffles that are often used to distribute the fluid flow at the point of entry of the vessel in commercial use.

Figure 9A:
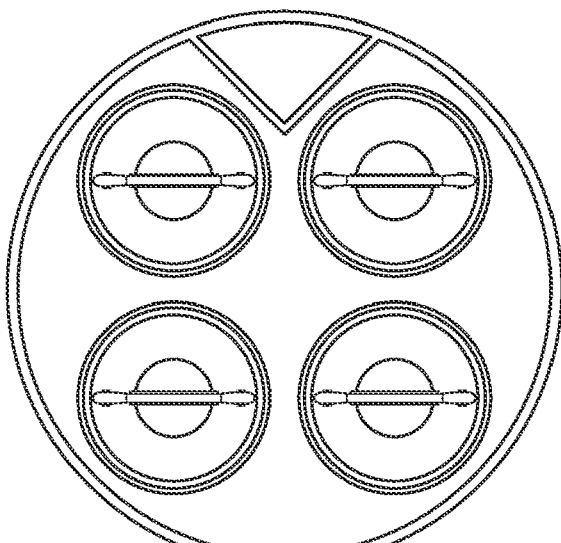
FIGS. 9A and 9B are views comparing the use of cylindrical filters and rectangular filters in an 18 inch diameter vessel.
Figure 9B:
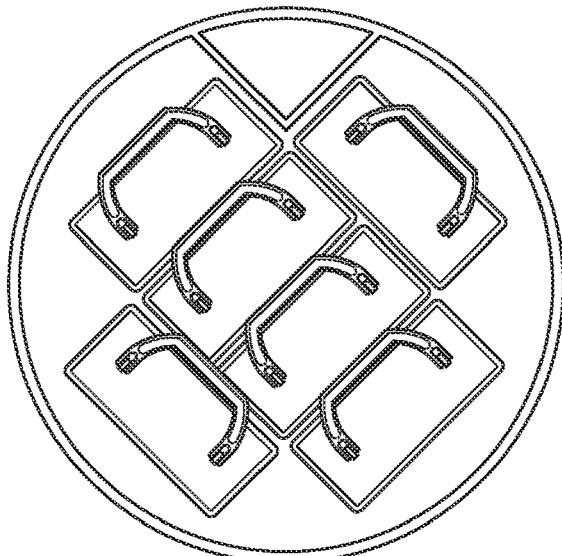
Figure 10A:
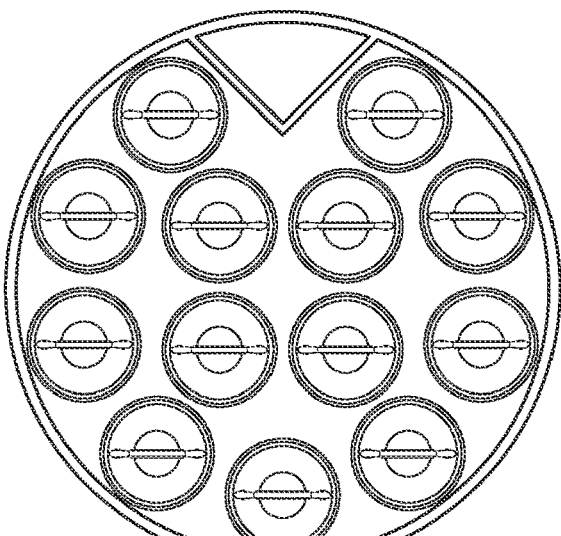
FIGS. 10A and 10B are views comparing the use of cylindrical filters and rectangular filters in a 30 inch diameter vessel.
Figure 10B:
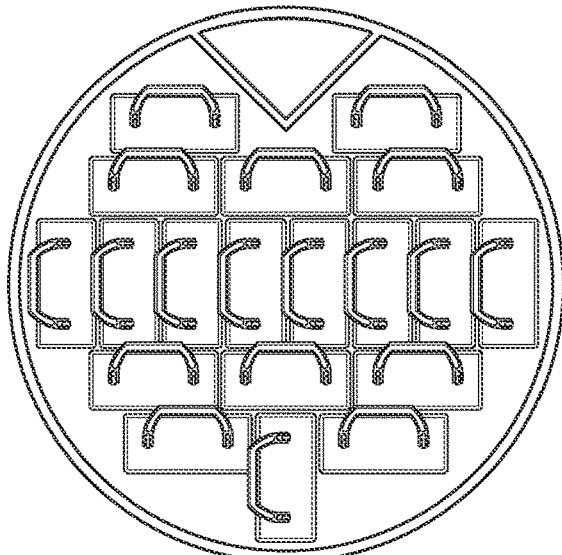

The efficiency of the invention has been tested using the rectangular shaped filter assemblies for filtering solids from liquids. FIGS. 9A and 9B are a comparison of the placement of cylindrical and rectangular shaped filters in an 18 inch diameter vessel. FIGS. 10A and 10B are a comparison of the placement of cylindrical and rectangular shaped filters in a 30 inch diameter vessel. These drawings are illustrative of the filter placement in two conventional sized vessels and the same type of arrangement can be used in any size of vessel with rectangular shaped filter elements sized to fit the vessel. Depending on the design, various number of the rectangular filter elements can be provided inside the filter housing to increase the overall filter surface area. The spacing can be tight with enough flow between the elements for circulation of the fluid. The overall filtration efficiency is increased by the greater filter surface area, as compared to a conventional filter using cylindrical cartridges, will improve by at least 58-175% for vessels larger than 18 inches in diameter, depending on the size of the rectangular shaped filter elements and/or fluid to be filtered. The data is based on the use of pleated media. The life of the filter is longer due to the increase in the amount of fluid that can be filtered with the novel assembly and can be up to a 7.5 longer filter life. Also, due to the increased filtration efficiency a smaller vessel filled with the rectangular shaped filters can be used to filter the same capacity as a larger vessel with cylindrical filters. The increased filter life and the possible use of a smaller vessel is a benefit for all embodiments of the invention.

Table 1 compares various parameters for cellulose pleated media rectangular shaped filters compared to cylindrical filters in filter vessels with typical diameters. The 18 inch and 30 inch vessels are illustrated in FIGS. 9A and B and 10A and B respectively. The data is for cellulose pleated media, but natural media results are expected to be equivalent and have the same or similar benefits of cellulose. The rectangular shaped filters are better in every regard including the number of filters contained in the vessel, the total filter media surface. The increase in media surface is proportional to the increase in filter efficiency.

TABLE 1

Rectangular vs Conventional Cylindrical Filter Cartridges
Cellulose

| Vessel Diameter (") | Conventional Cylindrical Filters Cartridge per Vessel Diameter (#) | Conventional Cylindrical Filter Cartridge Surface Area (ft²) | Rectangular Filters per Vessel Diameter (#) | Rectangular Filter Surface Area per Vessel Diameter (ft²) | Surface area (ft²) increase Rectangular Filter vs Conventional Cylindrical Filter by percentage (%) | Surface area (ft²) increase Rectangular Filter vs Conventional Cylindrical Filter by multiple (x) |
|---|---|---|---|---|---|---|
| 18 | 4 | 272 | 6 | 748 | 175% | 2.75× |
| 24 | 8 | 544 | 11 | 1371 | 152% | 2.52× |
| 30 | 13 | 884 | 19 | 2368 | 168% | 2.68× |
| 36 | 21 | 1428 | 26 | 3240 | 127% | 2.27× |
| 42 | 29 | 1972 | 38 | 4735 | 140% | 2.40× |
| 48 | 37 | 2516 | 43 | 5358 | 113% | 2.13× |

The same data is presented in Table 2 for pleated polypropylene media. The same or similar results can be expected for other synthetic media.

TABLE 2

Rectangular vs Conventional Cylindrical Filter Cartridges
Polypropylene

| Vessel Diameter (") | Conventional Cylindrical Filters Cartridge per Vessel Diameter (#) | Conventional Cylindrical Filter Cartridge Surface Area (ft²) | Rectangular Filters per Vessel Diameter (#) | Rectangular Filter Surface Area per Vessel Diameter (ft²) | % increase in Surface area of Rectangular Filter vs Conventional Cylindrical Filter (%) | Increase in Surface area of Rectangular Filter vs Conventional Cylindrical Filter by multiple (x) |
|---|---|---|---|---|---|---|
| 18 | 4 | 248 | 6 | 507 | 104% | 2.04× |
| 24 | 8 | 496 | 11 | 929 | 87% | 1.87× |
| 30 | 13 | 806 | 19 | 1605 | 99% | 1.99× |
| 36 | 21 | 1302 | 26 | 2196 | 69% | 1.69× |
| 42 | 29 | 1798 | 38 | 3209 | 78% | 1.78× |
| 48 | 37 | 2294 | 43 | 3632 | 58% | 1.58× |

A further embodiment the invention is a method for filtering fluid. The fluid to be filtered is introduced into a filter housing with a plurality of rectangular shaped filters having top cap and bottom with media extending from the rectangular shaped top cap to the rectangular shaped bottom cap providing a generally rectangular central void inside the media. The fluid passes through a layer of the media and enters the void in the center of the rectangular shaped filters. The particulates remain on the outside of the filter. The filtered fluid is collected from the central void after the fluid has passes through the filter media. This is a method for outside to inside flow.

Alternatively, the method can be adapted for inside to outside flow. The fluid is introduced into the filter housing and into a central void located in each of the rectangular shaped filters. The fluid passes through a layer of media surrounding the void to outside the filter and particulates remain in the void. The fluid is collected in a separate chamber of the filter housing and removed.

Another embodiment is a method for removing liquid from a gas stream. A mixture of gas and liquid is introduced into a vessel. The gas and liquid mixture passes through a plurality of rectangular shaped coalescers from inside to outside of the filter media. The gas is allowed to ascend to the top of the vessel. The liquid is allowed to settle at the bottom of the vessel. The gas is removed from the top of the vessel, while the liquid is removed from the bottom of the vessel. A similar method can be used for outside to inside flow using a plurality of rectangular shaped coalescers.

A further embodiment of this invention is the method of separating liquids with different specific gravities. The first step in the preferred embodiment is introducing the liquid mixture into a vessel that is on a horizontal axis. The liquid mixture passes though one of a plurality of rectangular shaped coalescers from inside to outside the filter media. The lighter filtered fluid floats to the top of the vessel and the heavier filtered fluid to sinks to the top of the vessel after filtration. The lighter fluid is collected from to the top of the vessel and the heavier fluid is collected from the bottom of the vessel. A similar method can be used for outside to inside flow using a plurality of rectangular shaped coalescers.

An additional method is the liquid/liquid separation utilizing the same method as the gas liquid separation described above with a vessel that is upright rather than horizontal.

The invention claimed is:
1. A filter element for filtration of liquid, comprising:
   a) filter media in a trapezoidal shape with a first end and a second end along a longitudinal axis, and longer sides in between the first end and the second end flaring out such that the second end is wider than the first end, wherein the first end is parallel to the second end;
   b) a central void created by the media pleated inside the trapezoid extending from the first end to the second end;

c) a solid generally rectangular top cap that is secured to the media on top of the pleated media that maintains a rectangular profile of the top of the filter element; and d) a generally rectangular second end cap secured to the second end of the filter media;

wherein one of the first end cap and the second end cap is solid, and the other having a central opening that communicates with the central void in the filter media, wherein said second end cap is a longer rectangle to accommodate the flare of the trapezoidal media, and wherein a rectangular seal is provided on the end cap having the central opening to provide liquid-tight sealing when said filter element is mounted on a separation plate inside a filter housing.

2. The filter element of claim 1, wherein the end cap having the central opening further comprises a protruding nozzle, wherein the protruding nozzle is in fluid communication with the central void.

3. The filter element of claim 2, wherein the rectangular seal is provided on the protruding nozzle.

4. The filter element of claim 1, wherein the end cap having the central opening further comprises a rectangular recess, wherein the rectangular recess is in fluid communication with the central void.

5. The filter element of claim 4, wherein the rectangular seal is provided on an inside sidewall of the rectangular recess.

6. The filter element of claim 1, wherein the filter media is capable of operating at 5-35 psid without rupturing.

\* \* \* \* \*